No. 720,265. PATENTED FEB. 10, 1903.
D. F. LEPLEY.
MINE CAGE.
APPLICATION FILED SEPT. 15, 1902.
NO MODEL. 3 SHEETS—SHEET 2.

Witnesses
D. F. Lepley,
Inventor.
by C. A. Snow & Co.
Attorneys

No. 720,265. PATENTED FEB. 10, 1903.
D. F. LEPLEY.
MINE CAGE.
APPLICATION FILED SEPT. 15, 1902.
NO MODEL. 3 SHEETS—SHEET 3.
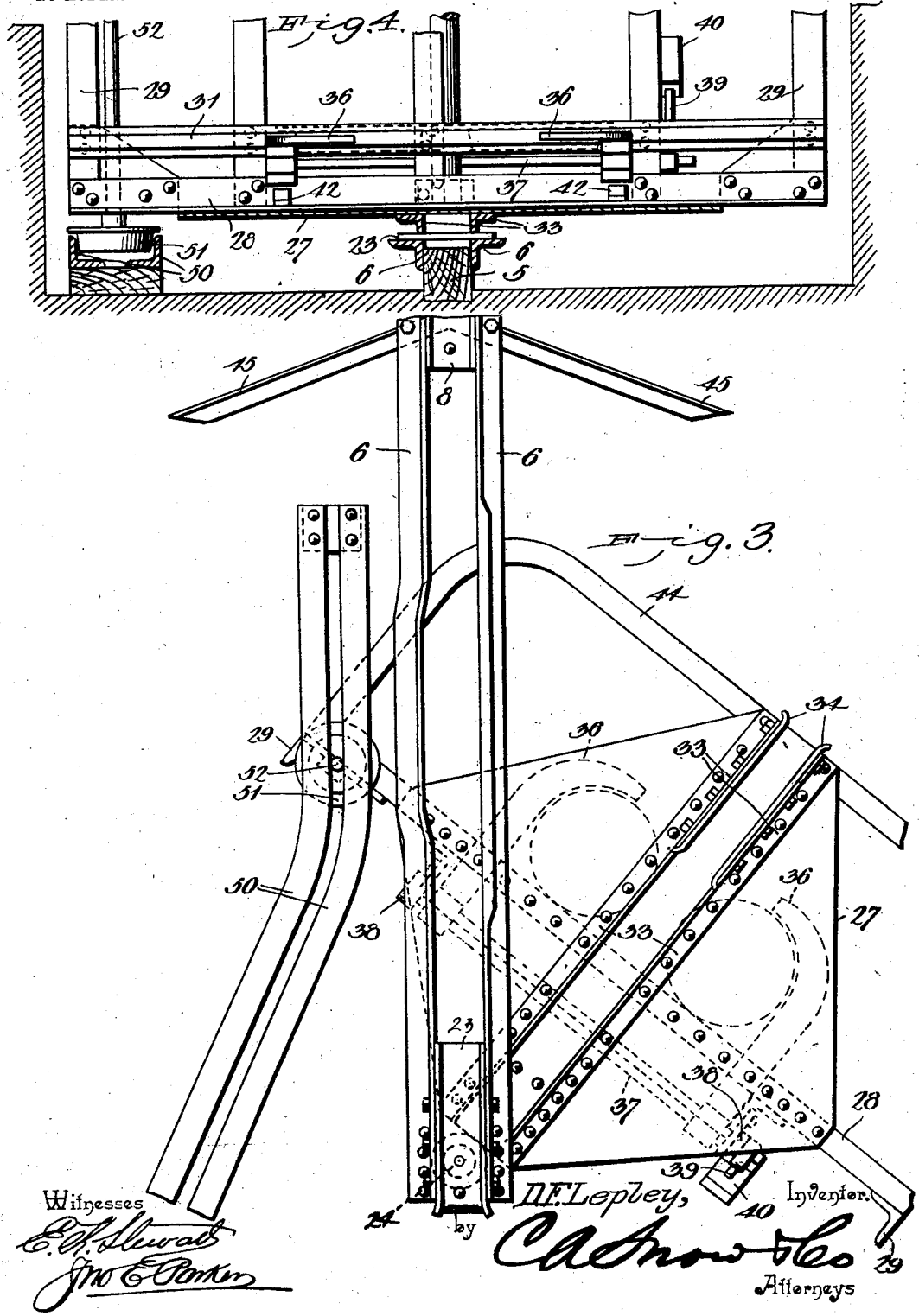

UNITED STATES PATENT OFFICE.

DANIEL F. LEPLEY, OF CONNELLSVILLE, PENNSYLVANIA.

MINE-CAGE.

SPECIFICATION forming part of Letters Patent No. 720,265, dated February 10, 1903.

Application filed September 15, 1902. Serial No. 123,494. (No model.)

*To all whom it may concern:*

Be it known that I, DANIEL F. LEPLEY, a citizen of the United States, residing at Connellsville, in the county of Fayette and State of Pennsylvania, have invented a new and useful Mine-Cage, of which the following is a specification.

This invention relates to certain improvements in cages or hoists employed in mine or other shafts and employed for elevating excavated material to the surface of the ground.

The principal object of the invention is to provide an improved form of cage or hoist from which the excavated material may be automatically discharged at the top of the shaft; and a further object is to provide an improved means for holding and guiding the platform of the cage during its movement from the normally horizontal to tilting position and its return to initial position.

A still further object of the invention is to provide an improved form of cage in which loaded cars may be run onto the platform and automatically locked in position, the cars being rigidly held to the platform until the cage is lowered to return the empty car to the bottom of the shaft.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

Figure 1:
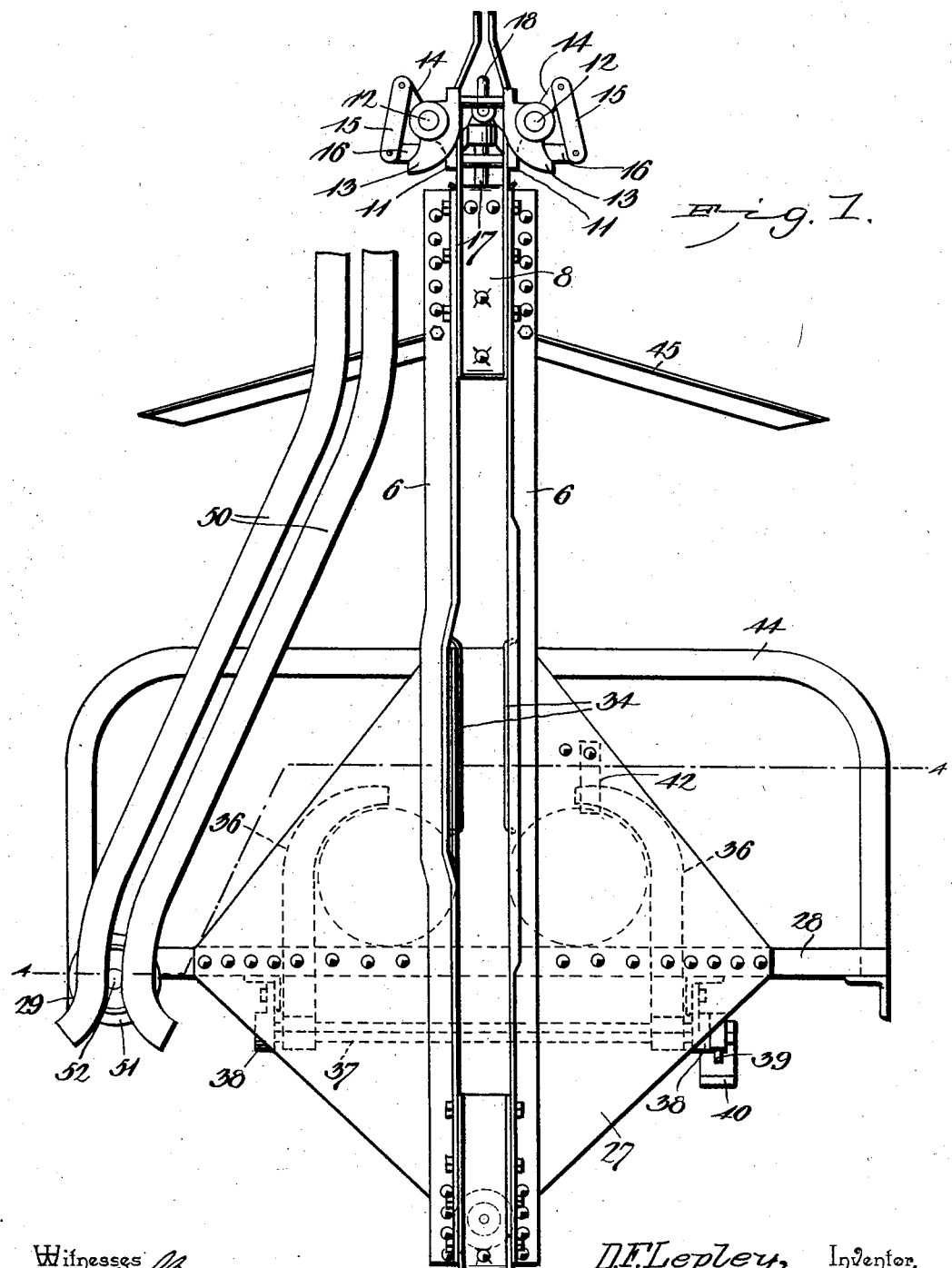
Figure 2:
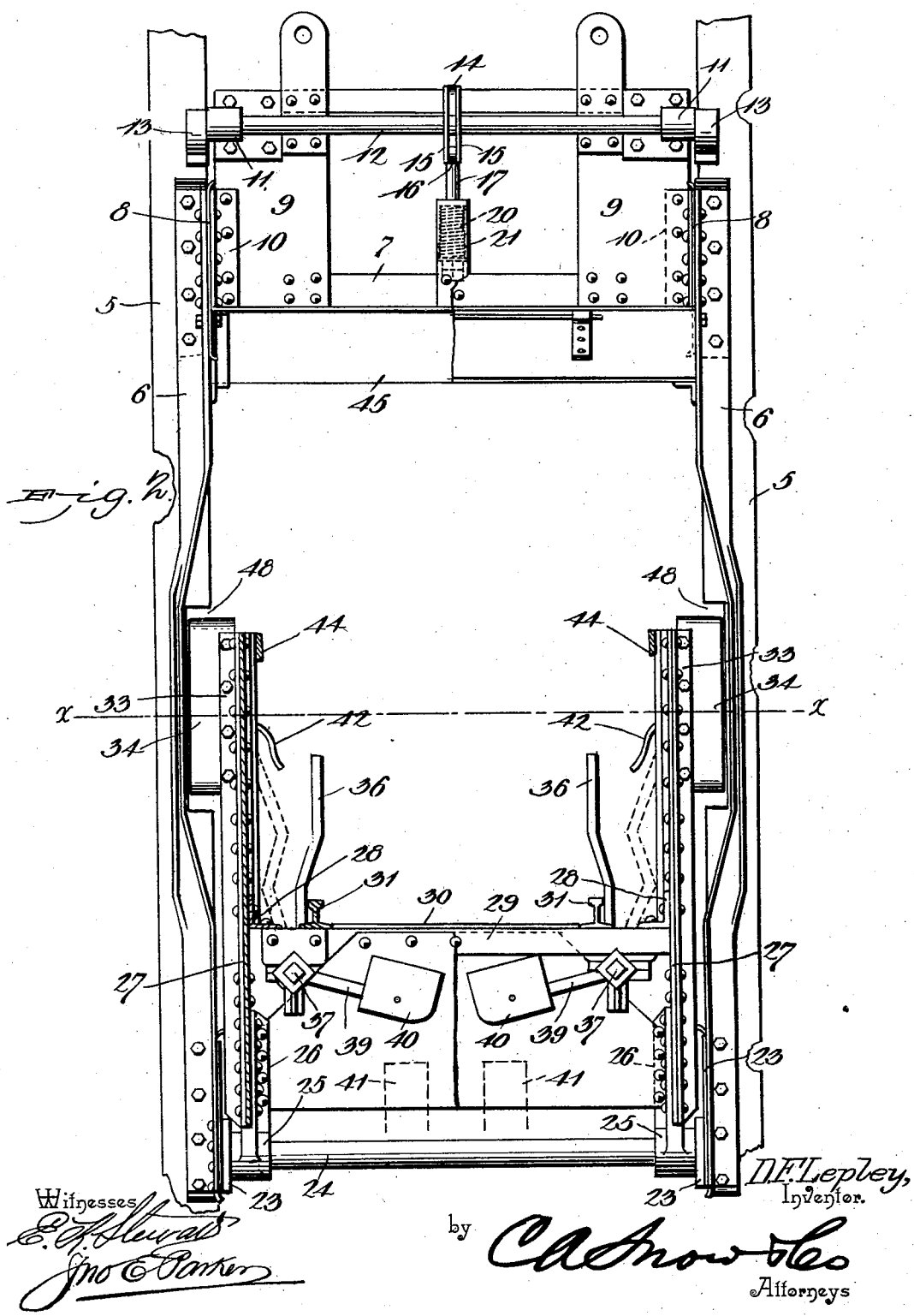

In the accompanying drawings, Figure 1 is a side elevation of a mine-cage constructed in accordance with my invention. Fig. 2 is an end elevation of the same. Fig. 3 is a side elevation similar to Fig. 1, illustrating the platform of the cage adjusted to dumping position. Fig. 4 is a sectional plan view of the cage on the line 4 4 of Fig. 1.

Similar numerals of reference are employed to indicate corresponding parts throughout the several figures of the drawings.
5 represents the usual guide-timbers extending from the bottom of the shaft to a point above the mouth of said shaft, the timbers being continued up to the usual tower, where the excavated material is dumped on a chute or conveyer.

The general framework of the cage is formed of structural iron and comprises guiding members 6, formed of angle-bars adapted for contact with the opposite sides of the guide-timbers and united at their upper ends by cross-bars 7. At the upper end of the guide-bars each pair of bars is united by a plate 8, and the latter are connected by small plates 9 to angle-bars 10. The plates 9 are provided with bearings 11 for the reception of a pair of shafts 12, having at their outer ends locking-cams 13, which are adapted to clutch against the opposite sides of the guide-timbers and lock the cage in position in the event of the breakage of the hoisting chain or cable. The central portion of each shaft is provided with a rigid rocker-arm 14, connected by a link 15 to one end of a transversely-disposed and slightly-curved bar 16, which is centrally connected to a vertically-guided pin 17, having an eye 18 for connection by an auxiliary cable or chain to the main hoisting-cable. This pin is surrounded by a helical compression-spring 20, arranged within a rigid casing 21, the spring being normally held compressed by a tension of the hoisting-cable; but in the event of breakage of the latter the expansive force of the spring will throw the clutching-cams 13 into locking engagement with the sides of the guide-timbers and prevent the cage from falling to the bottom of the shaft. To the lower end of each pair of angle-bars 6 is bolted a cross-plate 23, in which are formed bearings for the reception of a shaft or spindle 24, extending completely across the cage and serving partly as a brace to keep the members 6 in proper relative position. On the shaft or spindle 24 are pivoted two collars 25, which are connected by angle-bars 26 to two substantially rectangular plates 27, forming the opposite side members of the tilting platform, and to these side plates are bolted angle-bars 28, which extend somewhat beyond the lines of the angular side plates and are connected at their outer ends by cross-bars 29, also formed of angle-iron. The flooring 30 is formed of wood planks and is provided with a pair of rail-sections 31, on which the cars may be run at the bottom of the shaft. To the outer face of each of the angular plates 27 are bolted two parallel angle-bars 33, the outer edges of which are inside the inner line of the guide-timbers 5, these angle-bars being disposed in substantially the same plane as the main frame members 6. At a point intermediate of the length of the frame members the latter are bent outwardly, as indicated more clearly in Fig. 2, in order to leave a portion of the guide-timbers exposed, and at these points the angle-irons 33 are provided with guiding-shoes 34, having outwardly-curved or flared upper and lower ends and adapted to engage with the opposite sides of the guide-timbers and prevent any rocking movement of the platform on the shaft or spindle 24 while the cage is being raised or lowered.

The mining-cars, of which one is indicated in dotted lines, are of the usual type and provided with four flanged wheels adapted to the track 31, and in order to securely lock these cars in position during the movement from the bottom of the shaft to the dumping-point and the return of the empty car to the lowest position I employ four locking-arms 36, each having a curved portion adapted to fit over the tread of the wheel. The arms are arranged in pairs and each pair is carried by a shaft 37, adapted to bearings in brackets or hangers 38 on the under side of the platform. To each rock-shaft is secured an arm 39, having a counterweight 40, normally tending to maintain the arms in locking position and securely hold the car in position on the platform. At the bottom of the shaft are a pair of vertically-disposed posts 41, which engage the counterweights and positively raise the latter, resulting in the outward movement of the locking-arms to the dotted-line position illustrated in Fig. 2, the empty car being automatically released and run off the platform while a loaded car is placed in position and is automatically locked as soon as the cage rises sufficiently to remove the counterweight 40 from contact with the posts 41. At times it may be convenient to lock the arms in inoperative positions, and for this purpose small spring-clips 42 are employed to engage with and hold the locking-arms against the influence of the counterweights. The spring-clips 42 are merely in the form of small strips of spring metal, secured at their upper ends to the framework of the platform and so arranged that they may be grasped and partly straightened to permit the locking-arms 36 to pass under them. When released, the clips prevent the return of the arms to wheel-locking positions.

In order that the cage may be safely employed for raising and lowering passengers, hand-rails 44 are provided at each side of the platform, and to the main frame is secured a protecting-hood 45 to prevent coal or other material from falling on the platform or passengers.

At a point near the top of the tower each of the guide-timbers 5 is slotted or cut away, as indicated at 48, to permit lateral movement of the platform-guiding shoes 34. The slots are of such depth as not to interfere with the free movement of the main guiding-bars 6, but will permit of the passage of the shoes 34 as the platform moves to the dumping position. (Illustrated in Fig. 3.)

To one or both sides of the tower-frame are secured a pair of angle-bars 50, forming an inclined trackway or channel for the reception of a flanged wheel 51, carried by a shaft 52, adapted to suitable bearings on the under side of the platform. The lower portion of the trackway extends vertically for a short distance in order that the wheel 51 may enter the guiding-channel in advance of the movement of the platform to tilting position, and the lower ends of the angle-bars are outwardly flared, so that the wheel may more readily enter therein. The angle-bars extend in an inclined plane in the direction of the guiding-timbers and thence are extended vertically to a distance considerably above the position which the mine-cage ordinarily ascends to, so that in the event of the cage being forced above the normal position the guiding-roller will still be retained in the guiding-channel and all danger of breakage prevented. When the wheel or roller 51 enters the guiding-channel, the shoes 34 are slightly below the cut-away portion of the timbers, and as the guiding-shoes come opposite the cut-away portions the platform wheel or roller comes into contact with the inclined portion of the trackway and gradually forces the platform to tilting position, with the shaft or spindle 24 as a fulcrum, the shoes nearest the trackway passing readily through the cut-away portion of the timbers to the opposite side thereof. As the cage continues its upward movement the platform is moved to a greater angle until it assumes the dumping position, (illustrated in Fig. 3,) at which time the lower edge of the platform is over the edge of the chute and the end-gate of the car is opened and the coal or other excavated material is dumped into said chute without danger of any of the material falling to the bottom of the shaft. When the cage starts to descend, the trackway formed by the angle-bars 50 pulls the platform member and car back to the horizontal position, the shoes 30 being again restored to proper position with respect to the guiding-timbers and any further tilting movement of the platform prevented until the cage reascends with another car. A single trackway and guide-wheel 51 may be sufficient for ordinary purposes, or one may be employed at each side of the tower, if necessary.

Having thus described my invention, what I claim is—

1. The combination with the recessed guide-timbers, of a mine-cage having main guiding members adapted for contact with the opposite sides of the guide-timbers, a tilting platform pivotally supported by said guiding members, guide-shoes carried by a portion of the platform structure at points above the level of the platform and adapted for contact with the guide-timbers at a point intermediate of the length of the main guiding members, said shoes being adapted to pass through the recessed portion of the timbers on the tilting movement of the platform, inclined tracks supported at a point adjacent to the upper limit of movement of the cage, and means carried by the platform for engaging said inclined tracks.

2. The combination with the recessed guide-timbers, of a mine-cage formed of structural iron and comprising angle-bars disposed in pairs at each side of the frame and adapted for contact with the opposite sides of the timbers, a portion of each of the angle-bars being outwardly bent to expose the guide-timbers, a shaft or spindle carried by the guiding member, collars mounted thereon, angular plates rigidly secured to said collars, angle-bars secured to the plates and extending parallel with the main guide members, shoes carried by said angle-bars for contact with the exposed portions of the timbers, a platform carried by the angular plates and provided with track-sections, angle-bars secured near the upper limit of movement of the cage and forming an inclined trackway, and a guiding-roller mounted on the platform and adapted to engage said angle-bars to thereby effect positive movement of the platform to tilting position as the cage ascends, and returning movement of the platform to horizontal position during the descent of the cage.

3. The combination with the recessed guide-timbers, of a mine-cage having main guiding members adapted for contact with the opposite sides of the guide-timbers, an intermediate portion of each of the guiding members being outwardly bent to expose the timbers, a pivoted platform carried by the guiding members, shoes carried by the platform member and adapted for contact with the exposed portion of the timbers and to pass through the recessed portions of said timbers, an inclined trackway disposed at or near the upper limit of movement of the cage, and a platform member adapted to engage said trackway in advance of the movement of the platform to tilting position, said trackway serving as a positive guide for forcing the platform to tilting position during the ascent of the cage and for positively returning the same to horizontal position during the descent of said cage.

4. The combination with the recessed guide-timbers, of a mining-cage formed of structural iron and comprising main guiding members arranged in pairs adapted for contact with the opposite sides of the timbers, cross-bars connecting the upper ends of said members and provided with safety clutching devices, a shaft or spindle supported by the lower portion of the guiding members, collars carried by said shaft or spindle, oppositely-disposed angular plates rigidly secured to said collar and extending to a point toward the level of the platform proper, angle-bars secured to the outer faces of said plates and extending parallel with the main guiding members, shoes carried by the said angle-bars and adapted to pass through the recessed portions of the guide-timbers, track-sections carried by the platform for the reception of the car, counterweighted locking-arms adapted to engage and lock the wheels of the car, a hood carried by the main guiding members at a point above the platform, a pair of angle-bars disposed near the upper limit of movement of the cage and forming a guiding-channel, the lower ends of each of the angle-bars being outwardly flared, and a wheel or roller carried by the platform and adapted to enter said guiding-channel in advance of the movement of the platform to dumping position, said channel and roller forming a positive mechanism for moving the platform to dumping position and for restoring the same to initial position, substantially as specified.

In testimony that I claim the foregoing as my own I have hereto affixed my signature in the presence of two witnesses.

D. F. LEPLEY.

Witnesses:
  J. M. GREY,
  L. F. RUTH.